United States Patent [19]

Alessio

[11] 4,135,411
[45] Jan. 23, 1979

[54] GEAR TRANSMISSION

[75] Inventor: Lorenzo E. Alessio, Cairoli, Italy

[73] Assignee: The Black and Decker Manufacturing Company, Towson, Md.

[21] Appl. No.: 857,607

[22] Filed: Dec. 5, 1977

[30] Foreign Application Priority Data

Dec. 3, 1976 [IT] Italy .................. 30117 A/76

[51] Int. Cl.² .................. F16H 1/14; F16H 1/20
[52] U.S. Cl. .................. 74/417; 74/423
[58] Field of Search .................. 74/417, 423, 421 R, 74/412 R

[56] References Cited

U.S. PATENT DOCUMENTS 2,664,759  1/1954  Harper et al. .................. 74/417 X
3,817,115  6/1974  Schnizler et al. .................. 74/417

Primary Examiner—Leonard H. Gerin
Attorney, Agent, or Firm—Walter Ottesen; Leonard Bloom; Edward D. Murphy

[57] ABSTRACT

The invention is directed to a gear transmission for an angle tool such as a grinder, polisher, sander, angle screwdriver or the like having a drive motor for driving an output spindle shaft. The motor has a drive shaft defining a longitudinal axis transverse to the output spindle shaft. The gear transmission connects the drive shaft of the motor to the output spindle shaft and includes a first stop and a second stop on one of the shafts. A first gear is mounted on the one shaft so as to abut against the first stop and a second gear mounted on the other one of the shafts. A resilient annular bearing is tightly held between the second stop and the first gear; and, a cut-shaped retainer is disposed on the one shaft for containing the resilient annular bearing.

6 Claims, 1 Drawing Figure

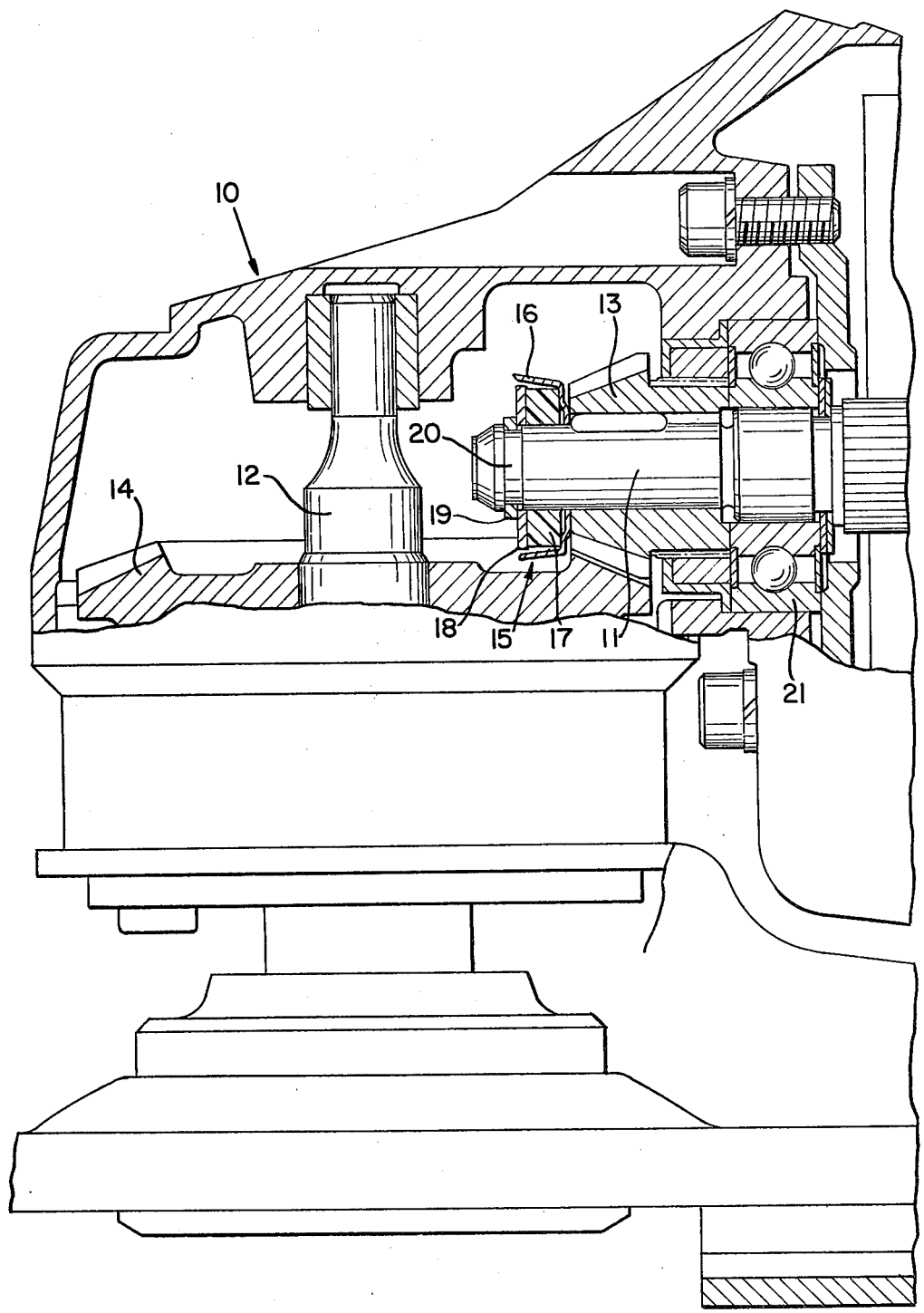

GEAR TRANSMISSION

BACKGROUND OF THE INVENTION

The invention relates to a gear transmission for angle tools such as a grinder, polisher, sander, angle screwdriver or the like.

In many gear transmission arrangements it is often necessary to transmit movement between two shafts arranged at 90° with respect to each other or even at a different angle such as an acute or an obtuse angle. In such a gear transmission, it is known to use two bevel gears mounted on respective shafts. These gears are manufactured within certain machining tolerances.

In assembly, it is necessary that these two gears be interconnected in such a manner that the axial play present because of these tolerances is taken up.

For this purpose, it is already known to use a nut-and-counternut assembly threadably engaging one of the two shafts. The nut-and-counternut assembly abuts against the outside end-face of the bevel gear whose other end-face can for instance abut against a support bearing of the very same shaft. Between the nut-and-counternut assembly and the outside end-face there are inserted one or more shimming washers.

This fastening system is relatively costly and the task of mounting the two gears correctly is difficult.

SUMMARY OF THE INVENTION

In view of the foregoing it is an object of the invention to provide a gear transmission assembly which is economical to manufacture and permits a rapid and correct assembly of the gears while at the same time providing the capability of taking up axial slack caused by machining tolerances.

The gear transmission according to my invention is especially applicable to angle tools such as a grinder, polisher, sander, angle screwdriver or the like having a drive motor for driving an output spindle shaft wherein the motor has a drive shaft defining a longitudinal axis transverse to the output spindle shaft. The gear transmission connects the drive shaft of the motor to the output spindle shaft. According to a feature of the gear transmission of my invention, I provide a first stop means and a second stop means on one of the shafts. A first gear is mounted on this one shaft so as to abut against the first stop means. A second gear is mounted on the other one of the shafts. Pursuant to another feature of my gear transmission, a resilient annular bearing is tightly held between the second stop means and the first gear; and, a cup-shaped retainer is disposed on the one shaft for containing the resilient annular bearing.

In an arrangement wherein the one shaft is held by a bearing of the tool having an inner race fixedly mounted to the one shaft, the first stop means can be the end face of the inner race of this bearing and the second stop means includes a groove formed in the one shaft with a lock ring force-fitted into this groove. A lock ring of the type suitable for this purpose is known as a Seeger ring.

BRIEF DESCRIPTION OF THE DRAWING

The above and other objects and advantages of the invention will become more apparent from a reading of the specification taken in conjunction with the enclosed drawing which shows a preferred embodiment of the gear transmission according to my invention. The gear transmission is here shown as part of an angle tool in the form of an angle sander.

DESCRIPTION OF THE PREFERRED EMBODIMENTS OF THE INVENTION

In the drawing, the reference numeral 10 designates the head of an angle sander driven by an electric motor (not shown). The drive shaft 11 of the motor transmits rotary movement to the output spindle shaft 12 by means of a pair of bevel gears 13 and 14, respectively. The bevel gears are mounted with a shrink fit onto the corresponding shafts 11 and 12.

According to the invention, the gear 13 is axially affixed onto the shaft 11 by means of a retainer assembly designated generally by reference numberal 15.

The assembly 15 includes a metal cup 16, an annular bearing 17 made of a suitable elastically yielding material which is held back inside the cup 16 by means of a retainer element, for instance a Seeger ring 19 forced inside a groove 20 of the shaft 11. The Seeger ring holds the assembly 15 in place by forcing the same against the left-hand end-face of the pinion gear 13 thereby holding the pinion gear 13 against the inner race of the bearing 21 of the shaft 11. Between the Seeger ring 19 and the annular bearing 17 there is arranged a metal washer 18 that is contained inside the cup 16 and serves to keep the bearing 17 in place when the latter deforms. The washer 18 is contained inside the cup for, if it would be on the outside, the bearing 17 onto which it exerts pressure might be squashed between the edge of the cup 16 and the outside edge of the washer 18.

From the drawing it is evident that the retainer assembly 15 of the gear transmission according to the invention not only prevents the axial withdrawal of the gear 13 from the shaft 11, but also affords during assembly a fast and correct coupling between the gears 13 and 14 with a mutual self-alignment accompanied by the taking up of any slack or clearance that may be present. This function is achieved by my retainer assembly because of the elastically yielding element included therein.

The gear transmission of my invention affords the advantage that it is very economical to manufacture. The retainer assembly includes an elastically yielding annular element that can be readily made out of suitable plastic material, and of a deep-drawn metal cup. Moreover, the end portion of the rotor shaft 11 does not need to be threaded but only has to be grooved thereby facilitating manufacture thereof.

The above described embodiment of my invention can be modified without departing from the scope of the invention defined in the claims. For instance, on the washer 18 there can be provided teeth or similar projections to prevent a mutual rotation between the washer 18 and the bearing 17 when they are subjected to a twisting motion.

I claim:
1. In an angle tool such as a grinder, polisher, sander, angle screwdriver or the like having a drive motor for driving an output spindle shaft, the motor having a drive shaft defining a longitudinal axis transverse to the output spindle shaft, a gear transmission connecting the drive shaft of the motor to the output spindle shaft, the gear transmission comprising:
   first stop means on one of said shafts;
   second stop means on said one shaft;
   a first gear mounted on said one shaft between said first stop means and said second stop means so as to abut against said first stop means;
   a second gear mounted on the other one of said shafts;

a resilient annular bearing tightly held between said second stop means and said first gear; and, a cup-shaped retainer disposed on said one shaft for containing said resilient annular bearing.

2. The gear transmission of claim 1 wherein said one shaft is held by a bearing of the tool having an inner race fixedly mounted to said one shaft, said first stop means being an end face of said inner race; and, said second stop means including: groove means formed in said one shaft, and a lock ring force-fitted into said groove means.

3. The gear transmission of claim 2 comprising: a washer disposed in said retainer between said resilient annular bearing and said lock ring.

4. In an angle tool such as a grinder, polisher, sander, angle screwdriver or the like having a motor for driving an output spindle shaft, the motor having a drive shaft defining a longitudinal axis transverse to the output spindle shaft, the drive shaft being rotatably held by a bearing having an inner race fixedly mounted on the drive shaft, a bevel gear transmission connecting the drive shaft to the output spindle shaft, the gear transmission comprising:

a bevel pinion gear mounted on said drive shaft so as to abut against said inner race;

a second bevel gear mounted on said output spindle shaft;

groove means formed on said drive shaft;

a lock ring force-fitted into said groove means;

a resilient annular bearing firmly held between said pinion gear and said lock ring; and, a metal cup-shaped retainer disposed on said one shaft for containing said resilient annular bearing.

5. The gear transmission of claim 4 comprising: a washer disposed in said retainer between said lock ring and said resilient annular bearing.

6. The gear transmission of claim 4, said resilient annular bearing being made of plastic.

* * * * *